United States Patent
Hicks et al.

(10) Patent No.: US 6,389,354 B1
(45) Date of Patent: May 14, 2002

(54) TERRAIN NAVIGATION APPARATUS

(75) Inventors: Andrew C Hicks, Plymouth; Ian W Scaysbrook, Tavistock; John R Fountain, Liskeard, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/601,368
(22) PCT Filed: Jun. 8, 2000
(86) PCT No.: PCT/GB00/02223
§ 371 Date: Aug. 1, 2000
§ 102(e) Date: Aug. 1, 2000
(87) PCT Pub. No.: WO01/02804
PCT Pub. Date: Jun. 8, 2000

(30) Foreign Application Priority Data

Jul. 2, 1999 (GB) ............................................... 9915362

(51) Int. Cl.⁷ ......................... G01S 13/00; H04B 7/185
(52) U.S. Cl. ..................... 701/200; 701/207; 340/970; 340/974; 340/978
(58) Field of Search ....................... 701/200, 3, 207, 701/211, 213, 214, 4; 340/970, 974, 978

(56) References Cited

U.S. PATENT DOCUMENTS

| | | | |
|---|---|---|---|
| 4,144,571 A | 3/1979 | Webber | 701/217 |
| 4,168,524 A | 9/1979 | Soltz et al. | |
| 4,495,580 A | 1/1985 | Keearns | 701/217 |
| 4,589,610 A | 5/1986 | Schmidt | 244/3.19 |
| 4,954,837 A * | 9/1990 | Baird et al. | 342/458 |
| 5,216,236 A | 6/1993 | Blais | |
| 5,335,181 A | 8/1994 | McGuffin | 701/200 |
| 5,355,317 A | 10/1994 | Knobbe | 700/97 |
| 5,359,403 A | 10/1994 | Grosmann et al. | |
| 5,892,462 A | 4/1999 | Tran | 340/961 |
| 6,094,607 A * | 7/2000 | Diesel | 701/4 |
| 6,218,980 B1 * | 4/2001 | Goebel et al. | 342/64 |

FOREIGN PATENT DOCUMENTS

| | | |
|---|---|---|
| EP | 0 061 564 | 10/1982 |
| EP | 0 383 114 | 8/1990 |

* cited by examiner

Primary Examiner—William A. Cuchlinski, Jr.
Assistant Examiner—Arthur D. Donnelly
(74) Attorney, Agent, or Firm—Nixon & Vanderhye P.C.

(57) ABSTRACT

Terrain navigation apparatus (1) for a stationary or moving vehicle (2) when the apparatus (1) is mounted thereon, including a system (3) for determining position, velocity, altitude and attitude incorporating at least six sensing means operable to provide signals indicative of a first measured height (5), a first velocity (7) and a first position (9) of the vehicle (2), scanning means (11) operable to scan terrain (13) around the vehicle (2) and measure a range (15) from the vehicle (2) thereto, first combining means (17) for combining signals indicative of the first measured height, the range and the first position (5, 15, 9) of the vehicle (2), together with error estimates (19) associated therewith, and for outputting results of said combining process, error-estimating means (21) for receiving as input signals results of said combining process and for providing said error estimates(19), such that the error-estimating means (21) and first combining means (17) operatively interact to effect terrain navigation of the stationary or moving vehicle (2).

16 Claims, 8 Drawing Sheets

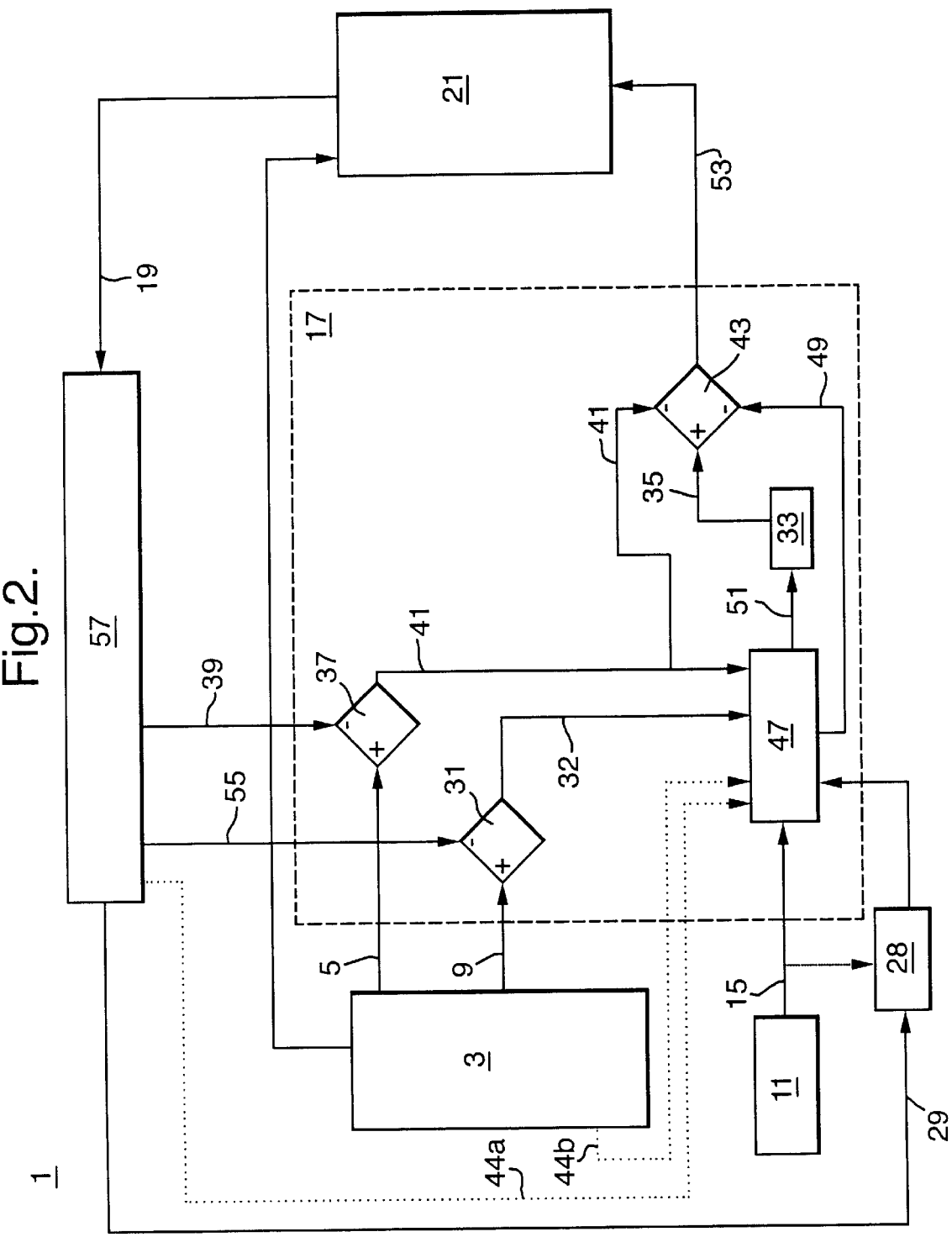

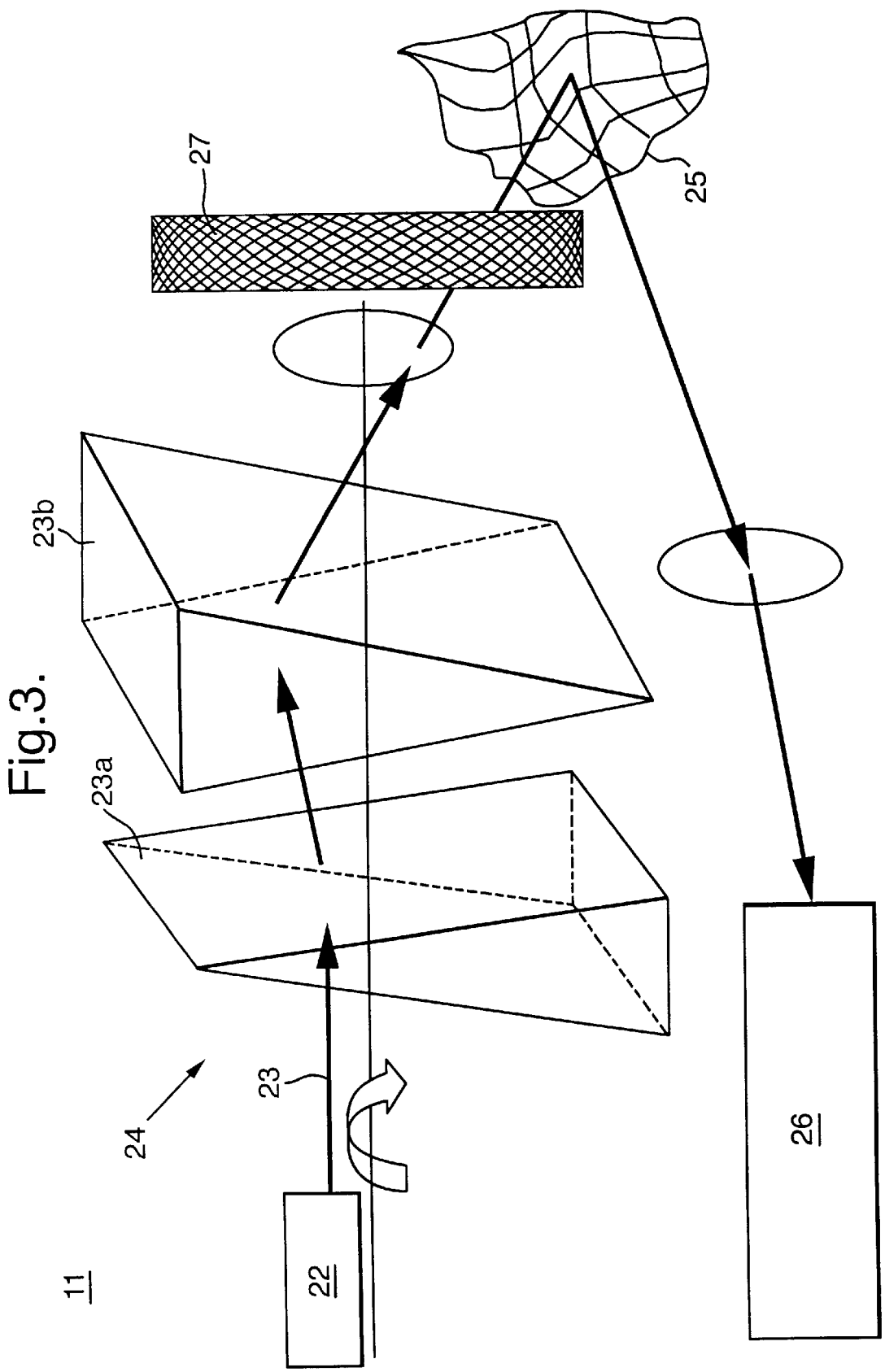

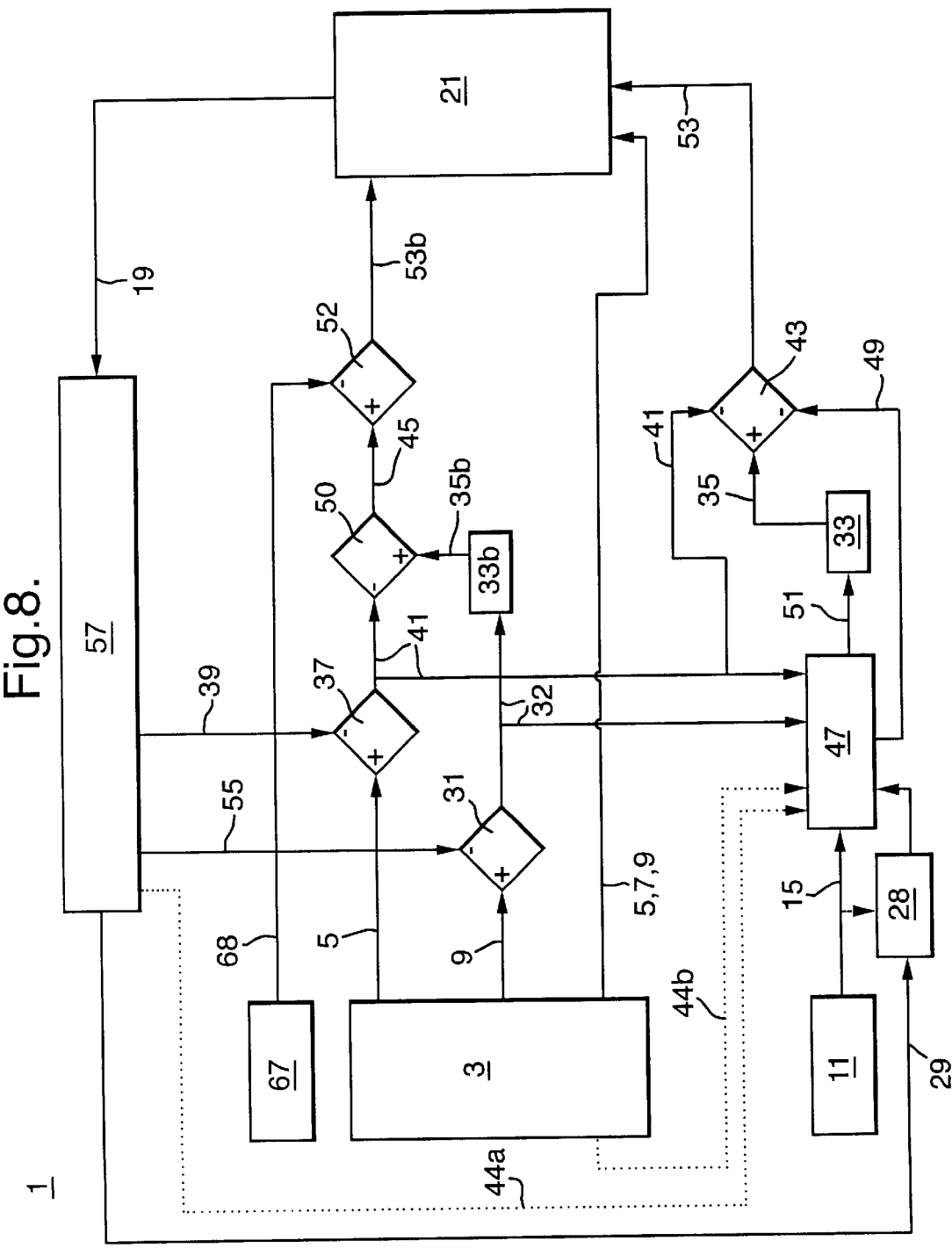

TERRAIN NAVIGATION APPARATUS

Figure 1:
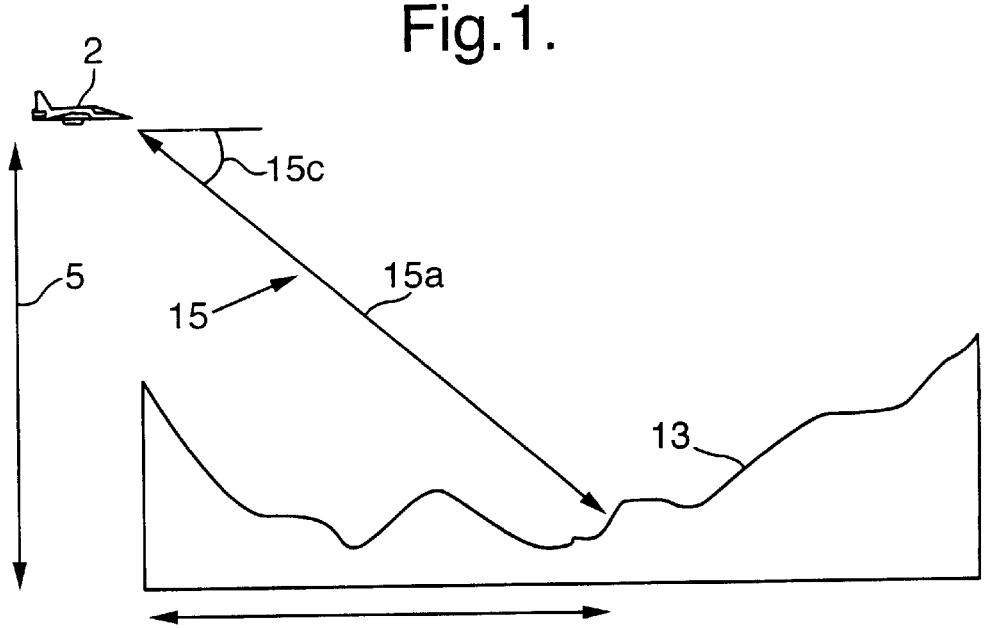

This invention relates to a terrain navigation apparatus and method suitable particularly, but not exclusively, for effecting terrain navigation of a stationary or moving vehicle.

The use of real-time measurements, models of how these measurements and the instrument characteristics providing the measurements vary over time, together with models of the coupling between the measurements and characteristics, is intrinsic to terrain navigation systems known in the art. If a true position reference is known, the performance of the navigation system can be measured by, among other parameters, the circular error probable and the linear error probable, yielding horizontal and vertical position information respectively, and in navigation systems known in the art, these errors increase to unacceptable levels in situations where measurements are taken over substantially flat ground, or when the vehicle is stationary. This can be generalised in terms of the relationship between the means for performing the measurement and the terrain to be measured: if there is no relative movement therebetween, or if the terrain profile is such that temporal measurement updates will be substantially unchanged, these errors can increase to unacceptable levels. Conventional terrain navigation systems rely on the assumption that the aircraft will be moving over undulating ground, and therefore do not provide sufficiently accurate information when these conditions are not satisfied.

A flight guidance system using forward looking sensors for terrain navigation has been developed by NASA. This system provides an estimate of the vertical positioning of the vehicle above ground level and uses terrain avoidance algorithms to calculate modifications to the vehicles trajectory which depend upon the characteristics of the sensed terrain from the forward sensor. However, the system relies upon traditional navigation aids to position itself with respect to the terrain and in particular, over a long flight period or for periods in which data from satellite navigation aids such as the Global Positioning System is unavailable, due perhaps to terrain obscuration or jamming, the absolute position of the vehicle cannot be accurately determined.

There is therefore a need for a generally improved apparatus and method of accurately determining position and attitude of a vehicle so as to effect stable terrain navigation while the vehicle traverses substantially flat terrain, or is stationary.

According to a first aspect of the invention there is provided terrain navigation apparatus for a stationary or moving vehicle when the apparatus is mounted thereon, including a system for determining position, velocity, altitude and attitude incorporating at least six sensing means operable to provide signals indicative of a first measured height, a first velocity and a first position of the vehicle, scanning means operable to scan terrain around the vehicle and measure a range from the vehicle thereto, first combining means for combining signals indicative of the first measured height, the range and the first position of the vehicle, together with error estimates associated therewith, and for outputting results of said combining process, error-estimating means for receiving as input signals results of said combining process and for providing said error estimates, such that the error-estimating means and first combining means operatively interact to effect terrain navigation of the stationary or moving vehicle.

Preferably the six sensing means include three mutually orthogonal specific force sensors and three mutually orthogonal angular rate sensors.

Conveniently the scanning means includes a laser obstacle detector laser radar having a laser operable to emit electromagnetic radiation, moving means to move the electromagnetic radiation so as to scan the terrain around the vehicle and detecting means to detect impingement of the radiation on the terrain and thereby measure the range from the vehicle thereto.

Advantageously the electromagnetic radiation utilised has a wavelength in the range of from 0.5 to 12 microns and especially of 10.59 microns.

Preferably the moving means is operable such that the electromagnetic radiation traces a Lissajous scan pattern on the terrain ahead of the vehicle substantially within 3 and −22 degrees in a vertical plane of the laser and substantially within ±25 degrees in a horizontal plane of the laser.

Conveniently there is provided attitude correcting means in operative association with the scanning means.

Advantageously the first combining means includes a first summation station, which first summation station receives as inputs the first position and an error estimate associated with the first position and outputs a second position, a second summation station, which second summation station receives as inputs the first measured height and an error estimate associated with the first measured height and outputs a second height, a conversion station, which conversion station receives as input the range from the vehicle to the terrain, the second position and the second height and outputs a second measured height and an intersection position, a map database, which map database provides as output an extrapolated height for an input of position, such that when the intersection position is input thereto, a first extrapolated height is output therefrom, a third summation station, which third summation station receives as inputs the first extrapolated height, the second height and the second measured height and outputs a height error.

Preferably the error estimating means includes a Kalman Filter, which Kalman Filter receives the height error as input and outputs said error estimate of the first measured height and the error estimate of first position.

Conveniently there is provided a satellite range triangulation system and second combining means.

Advantageously the satellite range triangulation system is a Global Positioning System (GPS) operable to output a second velocity.

Preferably the second combining means includes a further summation station, which further summation station receives as input the first velocity and second velocity and outputs a velocity error.

Conveniently the velocity error is input to the Kalman Filter comprising part of the error-estimating means.

According to a second aspect of the present invention there is provided a method for terrain navigation of a stationary or moving vehicle, including the steps of operating six sensing means, forming part of a system for determining position, velocity, altitude and attitude of a vehicle, to provide signals indicative of a first measured height, a first velocity and a first position of the vehicle, operating scanning means to measure a range from the vehicle to surrounding terrain, inputting the first measured height, the range and the first position of the vehicle to first combining means and outputting a height error therefrom, inputting the height error into error-estimating means, establishing in said error-estimating means estimates of errors associated with the sensing means output signals, subtracting, in the first combining means, said estimates of errors from the corresponding output signals in order to provide a corrected position and a corrected height, and using the same to effect terrain navigation of the stationary or moving vehicle.

Preferably the first combining means effects a combining process including the steps of summing inputs of the first position and an error estimate associated with the first position at a first summation station and outputting a second position, summing inputs of the first measured height and an error estimate associated with the first measured height and outputting a second height, converting, in a conversion station, the range from the vehicle to the terrain into a second measured height and an intersection position, extrapolating, in a map database, to provide a first extrapolated height from an input of the intersection position, summing inputs of the first extrapolated height, the second height and the second measured height and outputting a height error.

Conveniently the inputs of range, first measured height and first position are effected at a rate of substantially 12.5 Hz, the input of height error into the error-estimating means is effected at a rate in the range of from 2 to 4 Hz, the estimates of errors associated with the sensing means output signals are processed at a rate in the range of from 2 to 4 Hz, and the output therefrom is effected at substantially 12.5 Hz.

Figure 7:
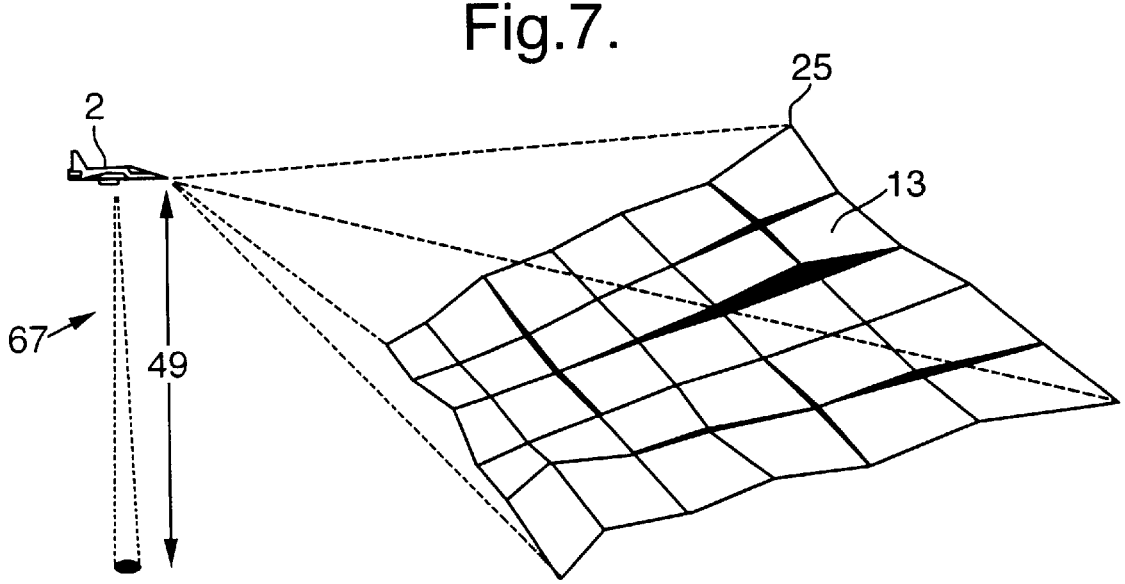
Figure 4:
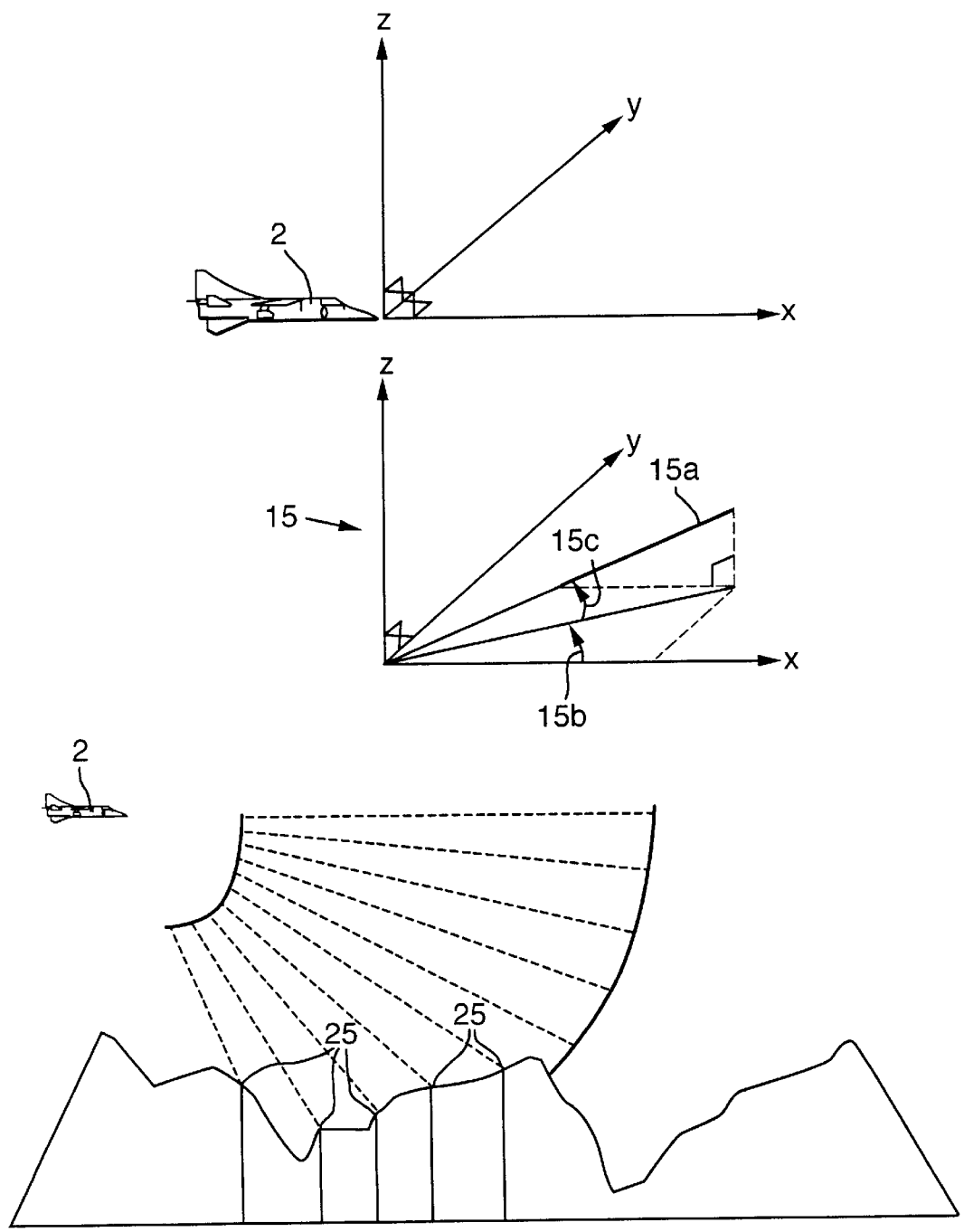
Figure 5:
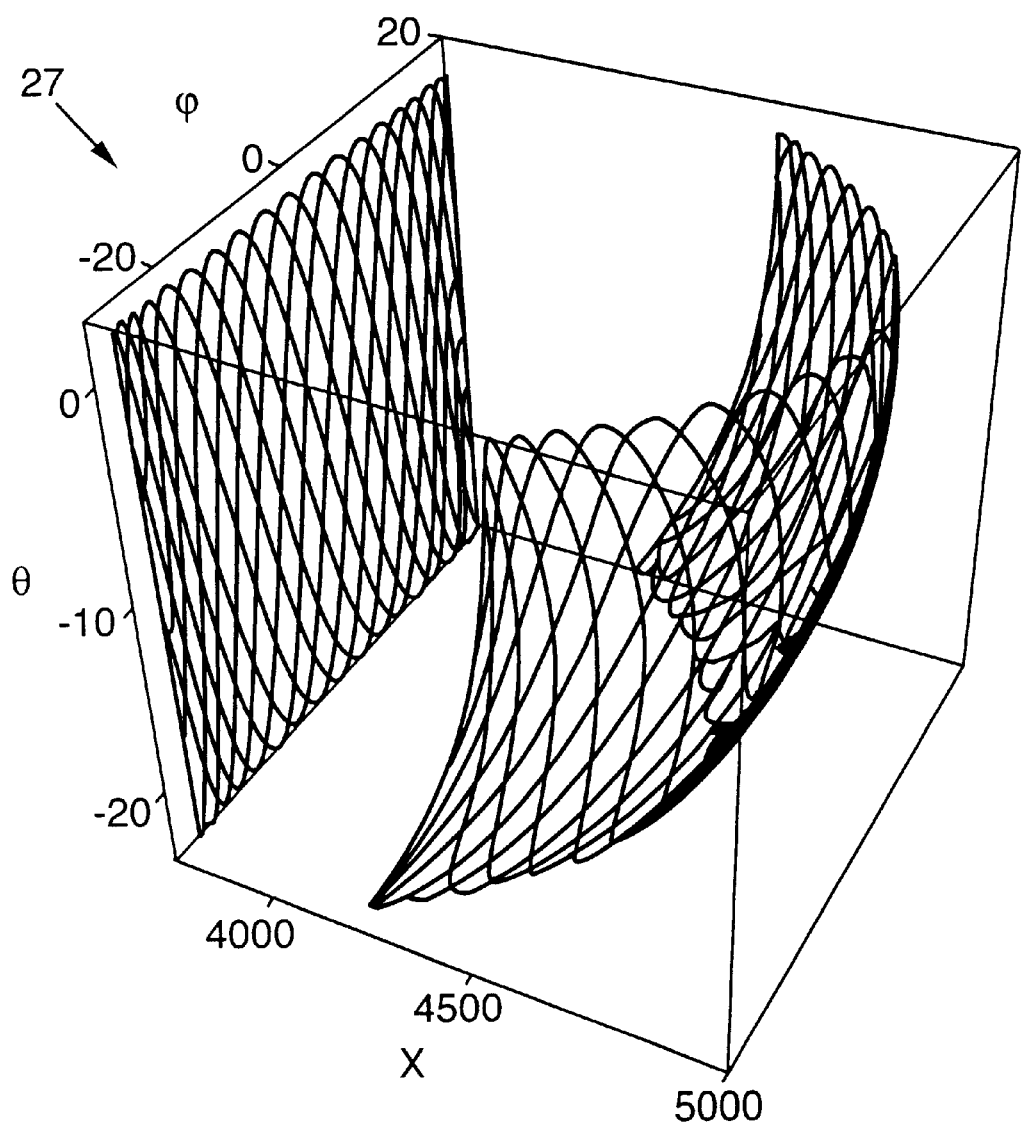
Figure 6:
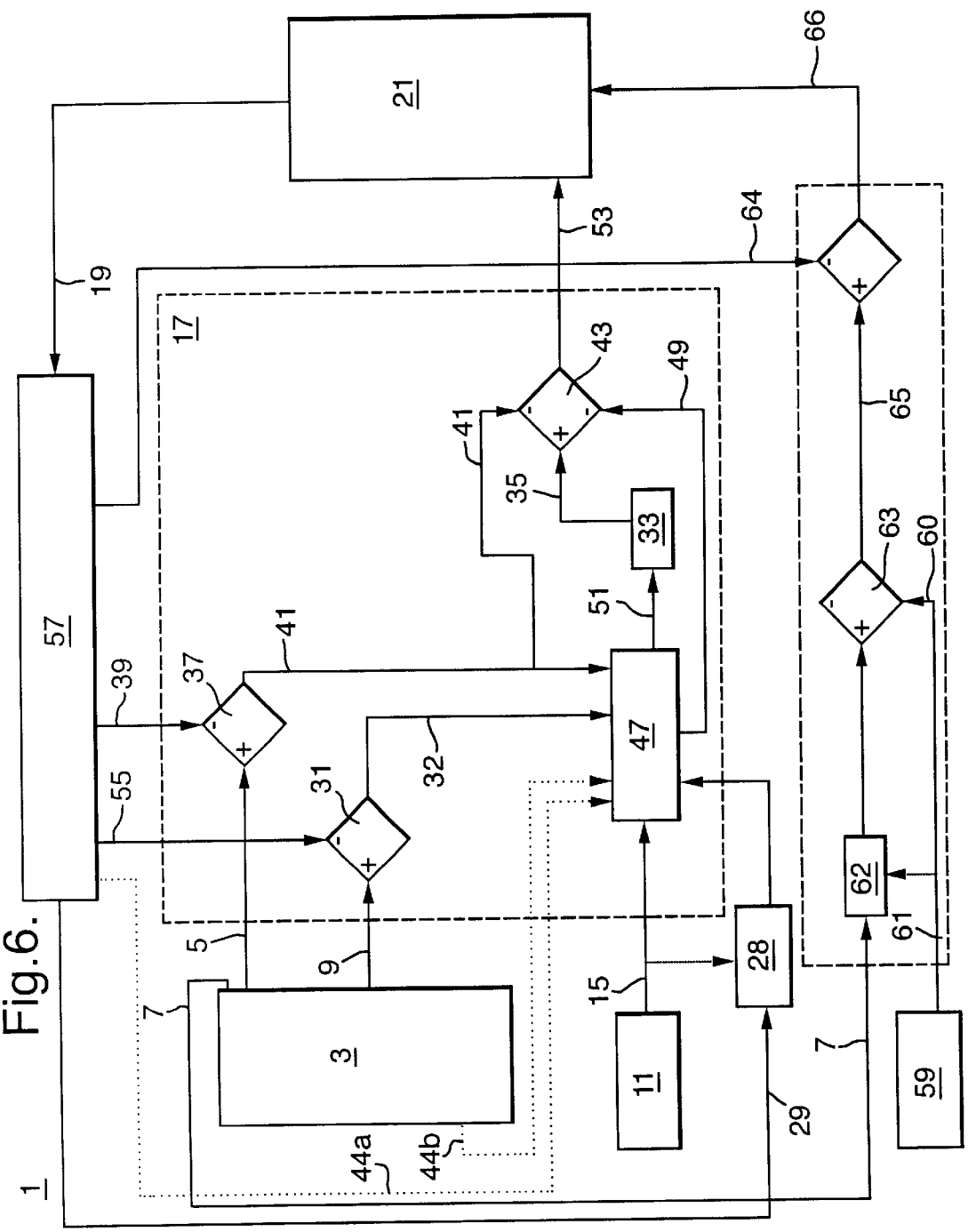
Figure 9:
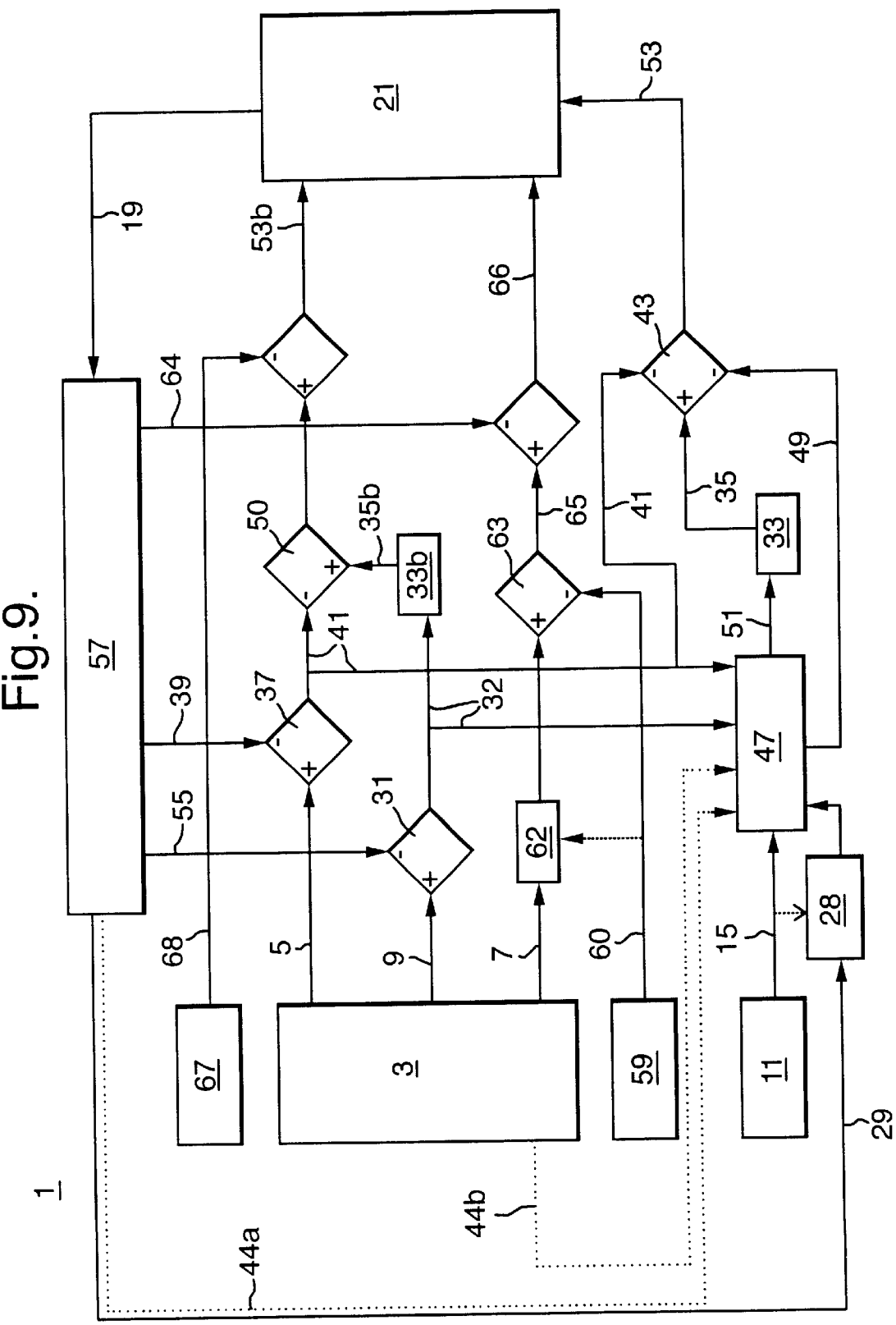

For a better understanding of the present invention, and to show how the same may be carried into effect, reference will now be made, by way of example, to the accompanying drawings, in which:

FIG. 1 is a side view of an airborne vehicle above terrain,

FIG. 2 is a block diagram illustrating apparatus according to a first embodiment of the present invention for carrying out the method of the present invention of effecting terrain navigation of the vehicle shown in FIG. 1, FIG. 3 is a schematic diagram of the scanning means forming part of the apparatus of FIG. 2, FIG. 4 is a side view of beam impingement of the scanning means forming part of the apparatus of FIG. 2, FIG. 5 is a perspective view of the scan pattern produced by the scanning means forming part of the apparatus of FIG. 2, FIG. 6 is a block diagram illustrating apparatus according to a second embodiment of the present invention for carrying out the method of the present invention of effecting terrain navigation of the vehicle shown in FIG. 1, FIG. 7 is a perspective view of the airborne vehicle of FIG. 1 according to a third embodiment of the present invention showing a Radar altimeter operating in combination with the scanning means forming part of the apparatus of FIG. 2, FIG. 8 is a block diagram illustrating the apparatus of FIG. 7, and FIG. 9 is a block diagram illustrating apparatus according to a fourth embodiment of the present invention for carrying out the method of the present invention of effecting terrain navigation of the vehicle shown in FIG. 1.

Apparatus of the invention for effecting terrain navigation of a moving or stationary vehicle as shown in FIGS. 1 to 9 is intended for use in situations where the vehicle is traversing a range of terrain profiles, including flat, substantially featureless ground and undulating terrain densely packed with obstacles, and also where the vehicle may be substantially stationary with respect to the terrain. Such apparatus is thus particularly suited for use in navigation systems of airborne vehicles. As discussed above, terrain navigation systems known in the art rely on movement of the vehicle to provide the required relative movement between the measurement means, attached to the vehicle, and the terrain. The present invention exploits the counterpart to this relationship, and accordingly an apparatus and method to move the measurement means on the vehicle itself is disclosed in the following description.

Thus as shown in FIGS. 1 and 2 of the accompanying drawings, apparatus 1 for terrain navigation of a stationary or moving vehicle 2 according to a first embodiment of the present invention includes a system 3 for determining position, velocity, altitude and attitude incorporating at least six sensing means operable to provide signals indicative of a first measured height 5, a first velocity 7 and a first position 9 of the vehicle 2, and scanning means 11 operable to scan terrain 13 around the vehicle 2 and measure a range 15 from the vehicle 2 thereto. In this specification, the range 15 includes the range return distance 15a from the aircraft 1 to the terrain 13, together with corresponding angles of azimuth and elevation 15b, 15c, as shown in FIG. 4.

The apparatus 1 also includes first combining means 17 for combining signals indicative of the first measured height 5, the range 15 land the first position 9 of the vehicle 2, together with error estimates 19 associated therewith, and for outputting results of said combining process. Error-estimating means 21 forms a further part of the apparatus 1, which error-estimating means 21 receives as input signals results of said combining process and provides said error estimates, such that the error-estimating means 21 and first combining means 17 operatively interact to effect terrain navigation of the stationary or moving vehicle 2.

The system 3 for determining position, velocity, altitude and attitude is preferably a strapdown inertial navigation system comprising an inertial measurement unit (IMU) which contains the at least six sensing means. These sensing means may include 3 mutually orthogonal specific force sensors and three mutually orthogonal angular rate sensors.

The outputs 5, 7, 9 from the system 3 are shown in FIGS. 2 and 8 (not shown in FIG. 6 or 9 for clarity) as direct inputs to the error-estimating means 21. These outputs always provide inputs to the error-estimating means directly, irrespective of any additional manipulations, for example as inputs 5, 9 to first combining means 17. In situations where the input measurement 53 to the error-estimating means 21 fails to satisfy thresholding conditions provided by a residual monitoring means known in the art, then the error estimating means 21 continues to estimate the errors 19 using outputs 5, 7, 9 alone.

The scanning means 11, illustrated schematically in FIG. 2 and FIG. 3, may include a laser obstacle detector or a laser radar device having a laser 22 operable to emit electromagnetic radiation 23 and moving means 24, to scan the terrain 13 around the vehicle 2 as shown in FIG. 4. The laser 22 may be a gas (e.g. carbon dioxide) or solid state (diode) laser, such that the electromagnetic radiation 23 utilised has a wavelength of between 0.5 and 12 microns, and is preferably 10.59 microns if the laser is of gas type, or 1.54 microns if the laser is of solid state type. The electromagnetic radiation 23 may have an output (Gaussian) pulse full width at half maximum of 100 nanoseconds, a diameter of 0.5 milliradians and a range of between 1 and 3500 metres, and the laser 22 may have a pulse repetition rate of substantially 50 kHz.

The moving means 24 may be provided by a path of suitable optical components, such that the electromagnetic radiation 23 passes two, preferably counter-rotating, prisms, 23a, 23b thereby to create, for example as shown in FIG. 5, a Lissajous scan pattern 27 on the terrain 13 ahead of the vehicle 2. This pattern 27 falls substantially within 3 and −22 degrees in a vertical plane of the laser 22 (elevation) and substantially within ±25 degrees in a horizontal plane of the laser 22 (azimuth).

The scanning means 11 also comprises detecting means 26, which may be a receiver unit coupled with a timing mechanism and a means of estimating the electromagnetic radiation 23 offset angles, the latter which may be calculated using data from the system 3 for determining position, velocity, altitude and attitude of the vehicle 2.

It is desirable for the scanning means to be gyro-stabilised so that it is always level with respect to the local vertical plane, irrespective of the aircraft attitude. However, if such a scanning means exists, it is likely to be heavier than a non-stabilised scanning means, due to the increased mechanical stabilisation required. In a practical setting, the scanning means is most likely to be aligned with the aircraft body axis such that when the aircraft is manoeuvring the scanning means will pitch and roll with the aircraft and be aligned with the aircraft heading. Thus attitude correcting means 29, shown in FIG. 2, is required to compensate for the fact that the scanning means 11 of the present invention is not gyro-stabilised. Accordingly the data used for a measurement update may be synchronised with the attitude correcting means 29, as shown in FIG. 2 at 28, and then the attitude errors 44a output from the error estimating means 21 may be transformed into the body axis of the aircraft to correct the attitude output from the system 3 for determining position, velocity, attitude and altitude. This may be performed in conversion station 47, to be described later.

FIG. 2 shows first combining means 17, which combines the measurements from the scanning means 11 and the system 3 for determining position, velocity, altitude and attitude, together with error estimates from the error-estimating means 21, and includes a first, second, and third summation stations 31, 37, 43, a map database 33 and a conversion station 47.

The first summation station 31 receives as inputs the first position 9 and the error estimate of first position 55 and outputs a second position 32, and the second summation station 37 receives as inputs the first measured height 5 and the error estimate 39 of first measured height and outputs a second height 41. The conversion station 47 receives as input the range 15 from the vehicle 2 to the terrain 13 from the scanning means 11, the second position 32 and second height 41 of the vehicle and outputs a second measured height 49 together with an intersection position 51.

Conversion station 47 thus provides an estimate of the intersection position 51 of the electromagnetic radiation 23 with the terrain 13, using the second position and second height 32, 41 (which are the best estimates of the position of the vehicle 2) in combination with its range return and known angles of azimuth and elevation 15a, 15b, 15c. In the case when a gyro-stabilised scanning means is available, the height of this intersection position, given as second measured height 49, together with the intersection position 51 may be derived from these parameters as shown in Equations 1, 2 and 3 below:

$$\lambda_{51} = \lambda_{32} + \left[\frac{180}{\pi R_{e\lambda}}\right] 15a\cos(15c)\cos(\text{Heading} - 15b) \quad (1)$$

$$\mu_{51} = \mu_{32} + \left[\frac{180}{\pi R_{e\mu}}\right] \frac{(15a\cos(15c)\sin(\text{Heading} - 15b))}{\cos\lambda_{51}} \quad (2)$$

$$h_{49} = h_{41} + 15a\sin(15c) \quad (3)$$

where $R_{e\lambda}$ and $R_{e\lambda}\mu$ are earth radii according to the reference geoid chosen, and all other parameters are given in relation to the numbers in FIG. 2, noting that position is defined in terms of latitude and longitude $\lambda, \mu$. The Heading is taken from the system 3 for determining position, velocity, altitude and attitude (not shown). When a gyro-stabilised scanning means is not available then the intersection position can be calculated using standard transformations from the aircraft body to navigation system co-ordinates, the former of which will be prior modified by a transformation from the laser co-ordinate system to the vehicle body co-ordinate system.

The map database 33 provides as output an extrapolated terrain height for an input of position, such that when the intersection position 51 is input thereto, a first extrapolated height 35 is output therefrom. The third summation station 43 receives as inputs the first extrapolated height 35, the second height 41 and the second measured height 49 and outputs height error 53.

The first combining means 17 provides a best estimate of the position (second position 32 in the terms defined above), which, together with the range return and pointing angles 15a, 15b, 15c, is used to derive an estimate of the position ahead of the aircraft 51 corresponding to the intersection of the electromagnetic radiation 23 and the terrain 13. This intersection position 51 is used to interrogate the stored digital map (the map database 33 ) in order to return the map height (first extrapolated height 35). The difference between the sum of the best estimate of the aircraft height above mean sea level (second height 41 ) and the height of the aircraft above the terrain intersection point (second measured height 49 ), and this map height (first extrapolated height 35 ), is used as input into the error-estimating means 21. The error-estimating means is preferably a Kalman filter, and the outputs of the Kalman filter 19, stored at 57 in FIG. 2, are then the best estimate of the errors, providing updates to the first combining means 17 to the stations described above.

FIG. 6 of the accompanying drawings shows apparatus 1 for terrain navigation of a stationary or moving vehicle according to a second embodiment of the present invention generally similar to that of FIGS. 1 to 5 in which like parts have been given like reference numerals and will not be described further in detail. This embodiment further provides a satellite range triangulation system, preferably a Global Positioning System (GPS) 59 operable to output a second velocity 60, and a second combining means 61. The second combining means 61 includes a further summation station 63 for receiving as input the first velocity 7 and second velocity 60 and outputting a velocity error 65, and these two inputs of velocity, 7, 60 are preferably synchronised 62 to give a time of validity of the velocity error 65. The velocity error 65 is then summed with an error estimate corresponding to the first velocity 64, output from the error-estimating means 21, to provide an input to the error-estimating means at 66. There may also be provided a sixth summation station (not shown), which receives as input the first position 9 and a GPS position from the GPS 59 and outputs a position error which would be input to the Kalman Filter comprising part of the error-estimating means 21. This would be used as a calibrating measure, should the horizontal and vertical error estimates and their probabilistic error bounds (uncertainties in the language known in the art) associated with position (described above) become unacceptably large.

FIGS. 7 and 8 of the accompanying drawings shows apparatus 1 for terrain navigation of a stationary or moving vehicle according to a third embodiment of the present invention generally similar to that of FIGS. 1 to 5 in which like parts have been given like reference numerals and will not be described further in detail. This embodiment provides for the alternate or concurrent use of a radar altimeter 67, shown pictorially in FIG. 7 and schematically in FIG. 8, for inputs of height error 53 into the error-estimating means 21. Thus in comparison with the first embodiment, shown in FIG. 2, there are two inputs to the error-estimating means 21 shown, and there are two additional summation stations 50, 52. A map database is required for both the radar altimeter 67 configuration and the scanning means 11 configuration, and use thereof by the two systems is differentiated by 33 and 33b for clarity. The radar altimeter 67 configuration takes the output 32 from the first summation station 31 directly into the map database 33b to provide the first extrapolated height 35b, and this is combined directly with the second position 41 as shown at 50. The use of a radar altimeter 67 with terrain navigation systems is known in the art, and the integration of the height measurement 68 therefrom is performed at summation station 52 in a known manner, yielding an additional input 53b to the error estimating means 21.

FIG. 9 of the accompanying drawings shows apparatus 1 for terrain navigation of a stationary or moving vehicle according to a third embodiment of the present invention generally similar to that of FIGS. 1 to 8 in which like parts have been given like reference numerals and will not be described further in detail. This embodiment provides for the alternate or concurrent use of a radar altimeter 67 together with a satellite range triangulation system, preferably a Global Positioning System (GPS) 59. The first and second combining means 17, 61 are not shown for clarity. This embodiment combines the features described above in connection with FIGS. 2, 6 and 8 and thus provides more measurements as input 53, 53b, 66 to the error-estimating means 21 than the previous embodiments.

The apparatus 1 of the invention, described above, is operable to effect terrain navigation of a moving or stationary vehicle as shown in FIGS. 1 to 9 by implementing a method of the invention. The method of the invention includes the steps of operating six sensing means, forming part of a system 3 for determining position, velocity, altitude and attitude of a vehicle, to provide signals indicative of a first measured height 5, a first velocity 7 and a first position 9 of the vehicle 2, operating scanning means 11 to measure a range 15 from the vehicle 2 to surrounding terrain 13, inputting the first measured height, the range and the first position 5, 15, 9 of the vehicle 2 to first combining means 17 and outputting a height error 53 therefrom, inputting the height error 53 into error-estimating means 21, establishing in said error-estimating means 21 estimates of errors 19 associated with the sensing means output signals, subtracting, in the first combining means 17, said estimates of errors 19 from the corresponding output signals in order to provide a corrected position and a corrected height, and using the same to effect terrain navigation of the stationary or moving vehicle 2.

The method performed by the first combining means 17 is iterative, and each iteration may comprise the following steps: the first position 9 and the error estimate of first position 55 are summed to provide a second position 32, and the first measured height 5 and the error estimate of first measured height 39 are summed to provide a second height 41; the second position 32 and second height 41 are input to a conversion station 47 in order to derive an intersection position 51, and this 51 is input to a map database 33, to provide a first extrapolated height 35. The first extrapolated height 35 is combined with the second height 41 and the second measured height 49 to provide a height error 53. As described above, the intersection position 51 is the intersection of the electromagnetic radiation 23 with the terrain 13 as the scanning means 11 scans the terrain 13 ahead of the vehicle 2.

The conversion of range 15 into second measured height 49, defined in equation 3 above, is effected in conversion station 47, which 47 may receive as input the attitude errors 44a and attitude output 44b corresponding to the system 3 for determining position, velocity, attitude and altitude, together with the second height and position 41, 32 and the range 15 (as defined above, the range 15 includes range return distance 15a from vehicle 2 to terrain 13, angle of azimuth 15b and angle of elevation 15c) which may have been synchronised with attitude correcting means 29. In an alternative configuration (not shown), the range may be input directly into the error estimating means 21.

The devices 3, 11 that provide inputs to the first combining means 17 correspondingly provide continuous updates such that the range 15, first measured height 5 and first position 9 may be input to the first combining means 17 at a rate of substantially 12.5 Hz. The height error 53 may thereafter be input to the error-estimating means 21 at a rate in the range of from 2 to 4 Hz, and the estimates of errors 19 associated with the sensing means output signals may be processed at a rate in the range of from 2 to 4 Hz in the error-estimating means 21, the output from which may be effected at substantially 12.5 Hz. In the absence of available measurements, or if the height error 53 fails to satisfy thresholding conditions within the error-estimating means 21, the first measured height 5, first velocity 7 and first position 9 will provide the only inputs to the error-estimating means 21, preferably at a rate of from 2 to 4 Hz.

As shown in FIG. 2, the error-estimating means 21 may take the height error 53, which as described above is a manipulation of the system measurements 5, 15, 9, together with models of the system measurement characteristics and outputs 5, 7, 9 from the system 3, as is distinctive of the known Kalman filter. The filter provides optimal estimates based on the model of the system defined, which may include error estimates of first measured height 39 and position 55 as described above, and the horizontal and vertical uncertainties, which are based on previous measurement information, probabilistic in nature and distinctive of the known Kalman filter, provide a measure of the filter's performance. At each update of the filter, the second position 32 is used for terrain navigation, as this is an estimate of the position ahead of the aircraft 1 corresponding to the intersection of the electromagnetic radiation 23 and the terrain 13 as shown in FIG. 4 at 25.

There are significant additional benefits to be gained from using a scanning means 11 of the type disclosed herein. The scanning means 11 can allow an aircraft to perform low level flights, because the sensor can be used to detect natural obstacles in the flight path, such as hills, trees and man-made obstacles such as power cables, and thus provides information for the pilot to adjust his flight path accordingly. Furthermore the amount of radiation emitted from the scanning means 11 is limited to the 'pencil' beam diameter of the laser beam, which, compared to alternative forward looking sensors, such as the terrain following radar which transmits radiation in a hemispherical region ahead of the aircraft. Significantly, the scanning means 11 may be replaced by a device such as a terrain following radar in order to effect terrain navigation as long as input of the range and offset angles of a particular return is feasible.

What is claimed is:

1. Terrain navigation apparatus for a stationary or moving vehicle when the apparatus is mounted thereon, including a system for determining position, velocity, altitude and attitude of the vehicle incorporating at least six sensing means operable to provide signals indicative of a first measured height, a first velocity and a first position of the vehicle, scanning means operable to scan terrain around the vehicle and measure a range from the vehicle thereto, first combining means for combining signals indicative of the first measured height, the range and the first position of the vehicle, together with error estimates associated therewith, and for outputting results of said combining process, error-estimating means for receiving as input signals results of said combining process and for providing said error estimates, such that the error-estimating means and first combining means operatively interact to effect terrain navigation of the stationary or moving vehicle.

2. Apparatus according to claim 1, wherein the six sensing means include three mutually orthogonal specific force sensors and three mutually orthogonal angular rate sensors.

3. Apparatus according to claim 1, wherein the scanning means includes a laser obstacle detector laser radar having a laser operable to emit electromagnetic radiation, moving means to move the electromagnetic radiation so as to scan the terrain around the vehicle and detecting means to detect impingement of the radiation on the terrain and thereby measure the range from the vehicle thereto.

4. Apparatus according to claim 3, wherein the electromagnetic radiation utilised has a wavelength in the range of from 0.5 to 12 microns.

5. Apparatus according to claim 4, wherein the electromagnetic radiation utilised has a wavelength of 10.59 microns.

6. Apparatus according to claim 4, wherein the moving means is operable such that the electromagnetic radiation traces a Lissajous scan pattern on the terrain ahead of the vehicle substantially within 3 and −22 degrees in a vertical plane of the laser and substantially within ±25 degrees in a horizontal plane of the laser.

7. Apparatus according to claim 6, including attitude correcting means in operative association with the scanning means.

8. Apparatus according to claim 1, wherein the first combining means includes a first summation station, which first summation station receives as inputs the first position and an error estimate associated with the first position and outputs a second position, a second summation station, which second summation station receives as inputs the first measured height and an error estimate associated with the first measured height and outputs a second height, a conversion station, which conversion station receives as input the range from the vehicle to the terrain, the second position and the second height and outputs a second measured height and an intersection position, a map database, which map database provides as output an extrapolated height for an input of position, such that when the intersection position is input thereto, a first extrapolated height is output therefrom, a third summation station, which third summation station receives as inputs the first extrapolated height, the second height and the second measured height and outputs a height error.

9. Apparatus according to claim 8, wherein the error estimating means includes a Kalman Filter, which Kalman Filter receives the height error as input and outputs said error estimate of the first measured height and the error estimate of first position.

10. Apparatus according to claim 1, including a satellite range triangulation system and second combining means.

11. Apparatus according to claim 10, wherein the satellite range triangulation system is a Global Positioning System (GPS) operable to output a second velocity.

12. Apparatus according to claim 11, wherein the second combining means includes a further summation station, which further summation station receives as input the first velocity and second velocity and outputs a velocity error.

13. Apparatus according to claim 12, wherein the velocity error is input to the Kalman Filter comprising part of the error-estimating means.

14. A method for terrain navigation of a stationary or moving vehicle, including the steps of operating six sensing means, forming part of a system for determining position, velocity, altitude and attitude of the vehicle, to provide signals indicative of a first measured height, a first velocity and a first position of the vehicle, operating scanning means to measure a range from the vehicle to surrounding terrain, inputting the first measured height, the range and the first position of the vehicle to first combining means and outputting a height error therefrom, inputting the height error into error-estimating means, establishing in said error-estimating means estimates of errors associated with the sensing means output signals, subtracting, in the first combining means, said estimates of errors from the corresponding output signals in order to provide a corrected position and a corrected height, and using the same to effect terrain navigation of the stationary or moving vehicle.

15. A method according to claim 14, in which the first combining means effects a combining process including the steps of summing inputs of the first position and an error estimate associated with the first position at a first summation station, and outputting a second position, summing inputs of the first measured height and an error estimate associated with the first measured height, and outputting a second height, converting, in a conversion station, the range from the vehicle to the terrain into a second measured height and an intersection position, extrapolating, in a map database, to provide a first extrapolated height from an input of the intersection position, summing inputs of the first extrapolated height, the second height and the second measured height and outputting a height error.

16. A method according to claim 15, in which the inputs of range, first measured height and first position are effected at a rate of substantially 12.5 Hz, the input of height error into the error-estimating means is effected at a rate in the range of from 2 to 4 Hz, the estimates of errors associated with the sensing means output signals are processed at a rate in the range of from 2 to 4 Hz, and the output therefrom is effected at substantially 12.5 Hz.

* * * * *